United States Patent
Chang (12)

(10) Patent No.: US 6,601,414 B1
(45) Date of Patent: Aug. 5, 2003

(54) ANTI-THEFT COMPACT DISK CASINGS

(76) Inventor: Kun-Fa Chang, No. 98, Yung Ho Road Da Ya Hsiang, Taichung Hsien (TW)

(*) Notice: Subject to any disclaimer, the term of this patent is extended or adjusted under 35 U.S.C. 154(b) by 3 days.

(21) Appl. No.: 10/047,655

(22) Filed: Jan. 17, 2002

(51) Int. Cl.[7] .............................................. E05B 65/00
(52) U.S. Cl. ............................ 70/57.1; 70/63; 206/1.5; 206/308.2; 206/387.11
(58) Field of Search .................... 70/57.1, 63; 206/1.5, 206/307, 308.1, 308.2, 387.1, 387.11

(56) References Cited

U.S. PATENT DOCUMENTS

| 3,837,692 A | * | 9/1974 | Ayers et al. ................. 70/63 X |
| 4,819,797 A | * | 4/1989 | Holmgren ............... 206/307 X |
| 5,039,982 A | * | 8/1991 | Bruhwiler ................ 206/1.5 X |
| 5,125,661 A | * | 6/1992 | Jarboe ....................... 70/63 X |
| 5,209,086 A | * | 5/1993 | Bruhwiler ................... 70/57.1 |
| 5,390,515 A | * | 2/1995 | Essick ....................... 70/63 X |
| 5,524,752 A | * | 6/1996 | Mazzucchelli ........... 206/308.2 |
| 5,588,315 A | * | 12/1996 | Holmgren .................. 70/57.1 |
| 5,636,535 A | * | 6/1997 | Shimada .................... 70/57.1 |
| 5,680,782 A | * | 10/1997 | Komatsu et al. ............ 70/57.1 |
| 5,718,332 A | * | 2/1998 | Tachibana ................ 206/308.2 |
| 5,901,840 A | * | 5/1999 | Nakasuji ..................... 206/1.5 |
| 5,931,291 A | * | 8/1999 | Sedon et al. ................ 206/1.5 |
| 5,934,114 A | * | 8/1999 | Weisburn et al. ............ 70/57.1 |
| 6,082,156 A | * | 7/2000 | Bin ........................... 70/57.1 |
| 6,102,200 A | * | 8/2000 | Dressen et al. .......... 206/308.2 |
| 6,135,280 A | * | 10/2000 | Burdett et al. ......... 206/387.11 |
| 6,202,454 B1 | * | 3/2001 | Nakasuji |
| 6,336,554 B1 | * | 1/2002 | Bruhwiler ................ 206/308.2 |
| 6,374,648 B1 | * | 4/2002 | Mitsuyama ................. 70/57.1 |
| 6,430,976 B1 | * | 8/2002 | Mitsuyama ................. 70/57.1 |
| 6,497,125 B1 | * | 12/2002 | Necchi ....................... 70/57.1 |

* cited by examiner

Primary Examiner—Suzanne Dino Barrett
(74) Attorney, Agent, or Firm—Charles E. Baxley

(57) ABSTRACT

A compact disk casing includes a base and a cover which is pivotally connected to the base. A locking plate is inserted from a side of the casing and is retained by a bridge member on the base so as to limit the cover from being opened. A locking member is located on a top surface of the base and the locking plate has two flexible matching members which are engaged with two engaging members of the locking member. A key can be inserted from an underside of the base to shift the two matching members to allow the locking plate to be pulled from the casing.

6 Claims, 6 Drawing Sheets

ANTI-THEFT COMPACT DISK CASINGS

FIELD OF THE INVENTION

The present invention relates to a compact disk casing which has a locking device to lock the cover and the base together.

BACKGROUND OF THE INVENTION

A conventional compact disk casing generally includes a base with a central protrusion extending from a top surface thereof and a cover is pivotally connected to the base. A compact disk is mounted its central hole to the central protrusion on the base so as to be positioned. However, there is no suitable locking device to prevent the cover from being opened without permission so that the compact disk in the casing is easily accessed. This is a serious concern for the compact shop owners who want to have a proper locking device or anti-theft device to limit the customers picking the compact disks from the casings.

The present invention intends to provide a locking device that locks the base and the cover so as to reduce the loss of taking the compact disks without permissions.

SUMMARY OF THE INVENTION

In accordance with one aspect of the present invention, there is provided a compact disk casing which comprises a base having an opening defined in a first sidewall of the base and a bridge member is located on a top surface of the base and located beside a second sidewall of the base. A slot is defined beneath of the bridge member. A locking member is located on the top surface of the base and located beside a third sidewall of the base. A cover is pivotally connected to a fourth sidewall of the base and has a first cover sidewall having two locking recesses defined therein. A locking box is located in an underside of the cover and has a hole therein. The locking box is positioned beside the bridge member when the cover is closed to the base. A locking plate is inserted through the opening when the first cover sidewall is engaged with the opening and a tongue extending from the locking plate is inserted in the slot beneath the bridge member and the hole in the locking box. Two matching members are on the locking plate and engaged with the locking member.

The primary object of the present invention is to provide a casing for receiving a compact disk therein and the cover cannot be opened by a locking device which locks the cover to the base.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
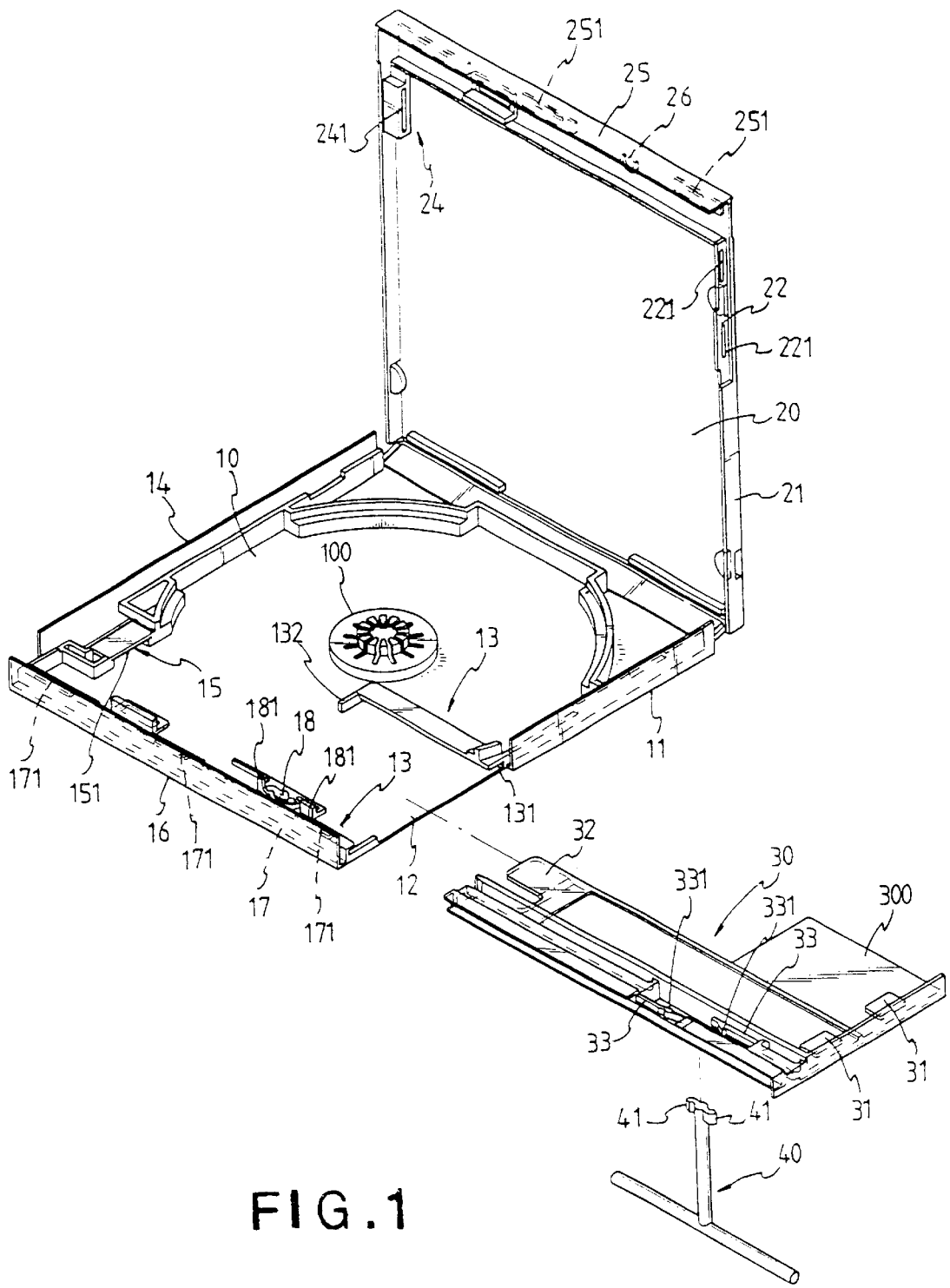
FIG. 1 is an exploded view to show the compact disk casing of the present invention and the locking plate.
Figure 2:
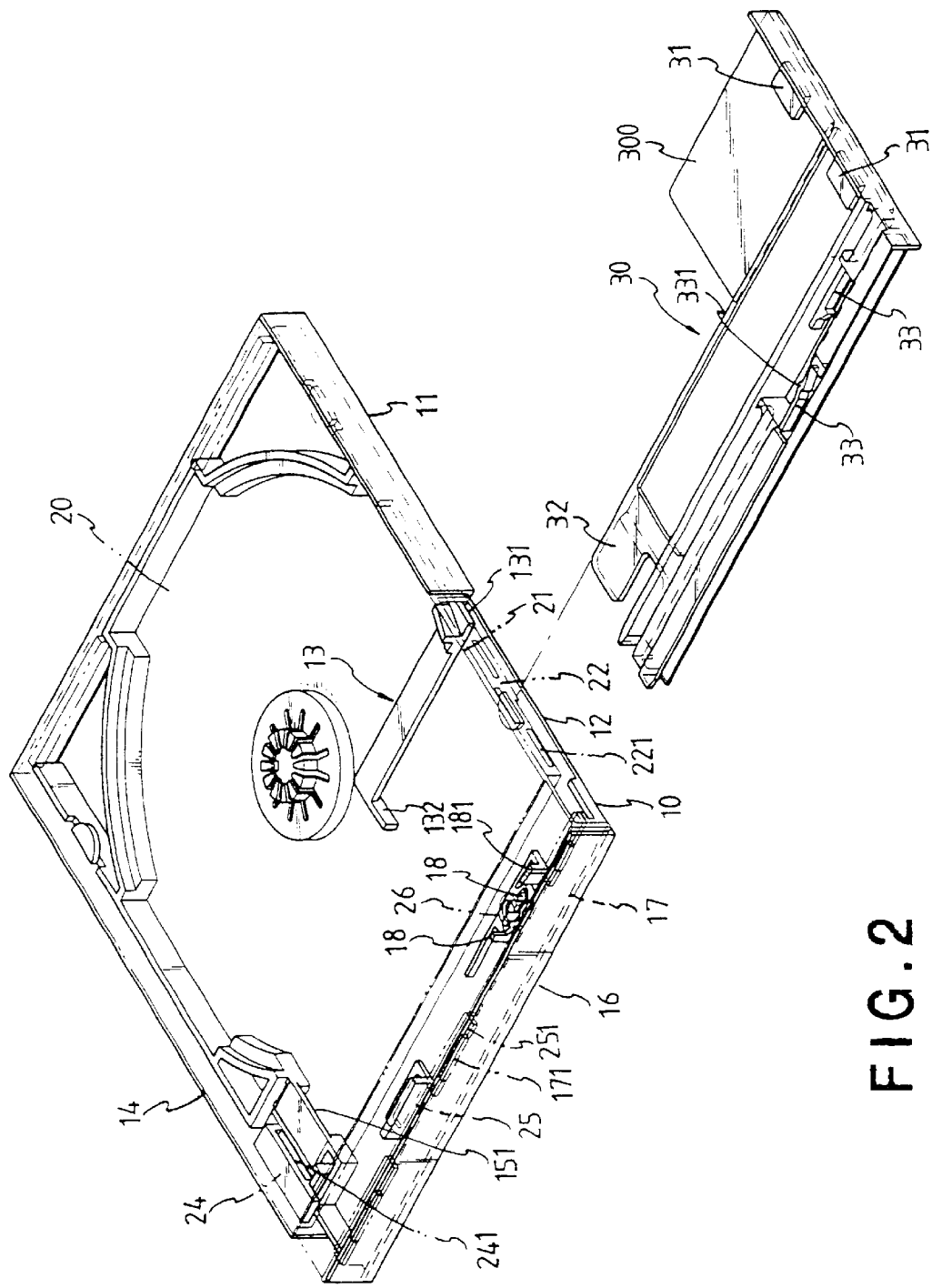
FIG. 2 is an exploded view to shove the compact disk casing of the present invention in a closed status and the locking plate.

Referring to FIGS. 1 and 2, the compact disk casing of the present invention comprises a base 10 having an opening 12 defined in a first sidewall 11 of the base 10 and an engaging device 100 is located at a center of a top surface of the base 10 for engaging with a central hole of a compact disk (not shown). A guide plate 13 is connected to the first sidewall 11 and a gap 131 is defined between the guide plate 13 and the top surface of the base 10. A stop 132 extends from the guide plate 13. A bridge member 15 is located on the top surface of the base 10 and beside a second sidewall 14 of the base 10. A slot 151 is defined beneath of the bridge member 15. The second sidewall 14 is located in opposite to the first sidewall 11. A locking member 18 is located on the top surface of the base 10 and located beside a third sidewall 16 of the base 10. A groove 17 is defined in the top surface of the base 10 and located beside the third sidewall 16. A plurality of lugs 171 extend from the top surface of the base 10 and are located beside the third sidewall 16.

A cover 20 is pivotally connected to a fourth sidewall of the base 10 and has a locking box 24 located in an underside of the cover 20. The locking box 24 has a hole 241 defined therein and will be positioned beside the bridge member 15 when the cover 20 is closes to the base 10. The cover 20 has a first cover sidewall 21 which has a narrow section 22 which has two locking recesses 221 defined therein. The cover 20 has a second cover sidewall 25 which is engaged with the groove 17 in the base 10. A plurality of notches 251 are defined in the underside of the cover 20 and the lugs 171 are engaged with the notches 251 when the cover 20 covers onto the base 10. The cover 20 has a recess 26 which receives the locking member 18 when the cover 20 is in closed position.

Figure 4:
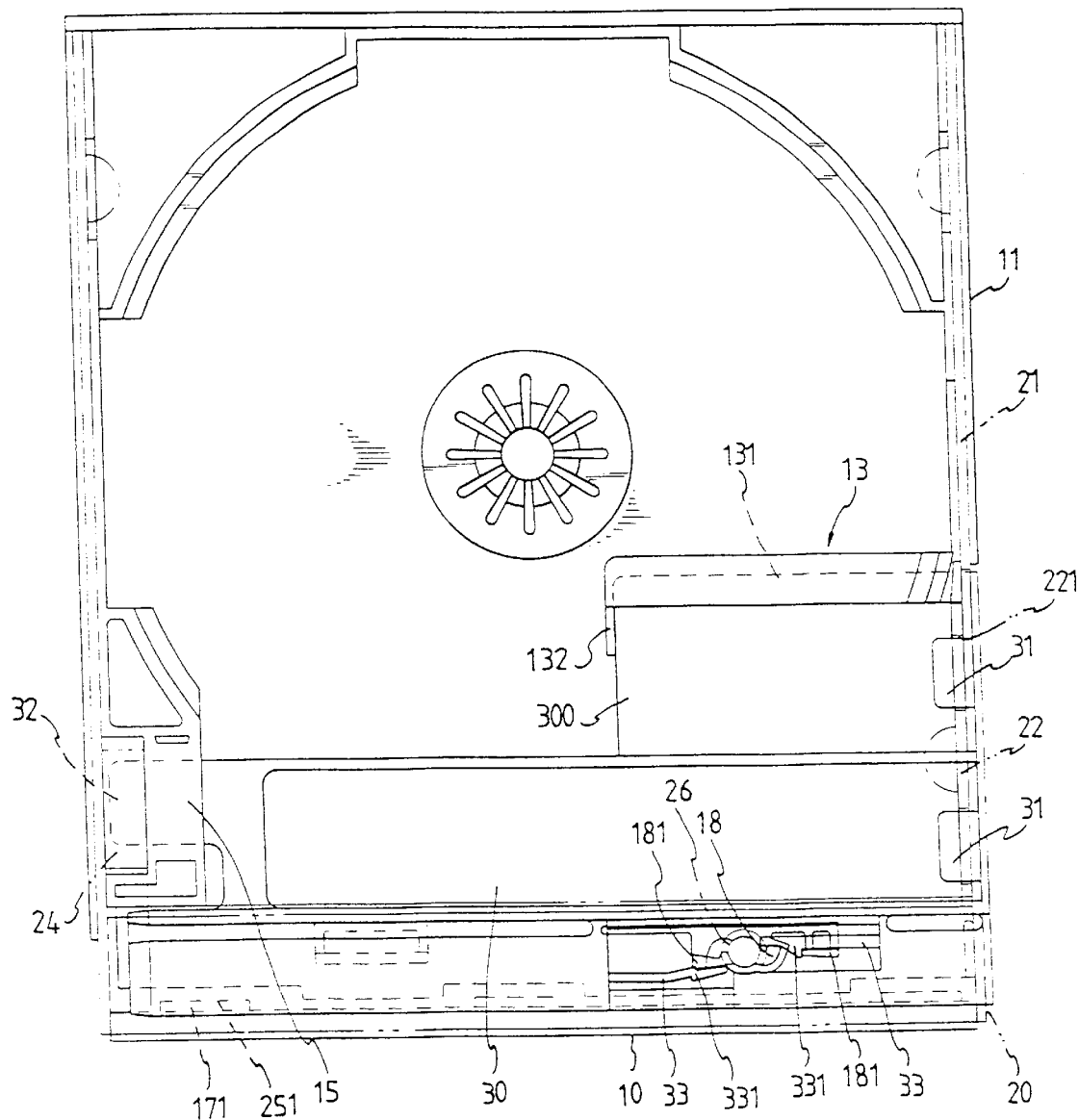
FIG. 4 shows the two matching members of the locking plate are engaged with the two engaging members of the locking member on the base.

A locking plate 30 is inserted through the opening 12 which is partially covered by the narrow section 22 of the first cover sidewall 21 when the cover 20 is matched with the base 10. The locking plate 30 has an insertion plate 300 which is inserted in the gap 131 and stopped by the stop 132. Referring to FIG. 4, the locking plate 30 further has an end wall which has two ribs 31 and the two ribs 31 are inserted in the locking recesses 221 in the first cover sidewall 21 of the cover 20. A tongue 32 extends from the locking plate 30 and through the slot 151 beneath the bridge member 15. The tongue 32 is inserted in the hole 241 in the locking box 24 so that the cover 20 cannot be opened. Two flexible matching members 33 connected to the locking plate 30 and each have a hook 331 which are engaged with two engaging members 181 on the locking member 18.

Figure 3:
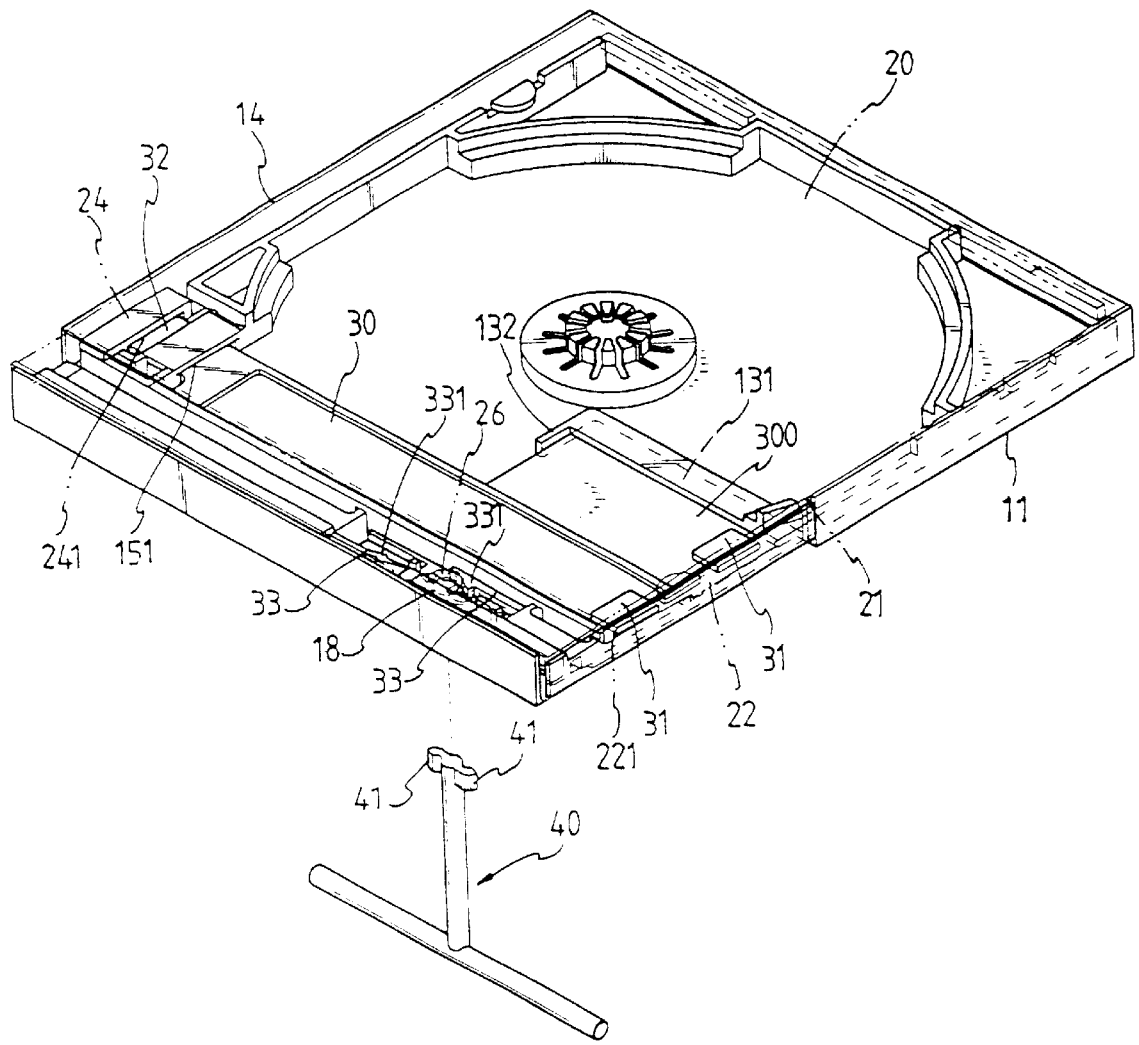
FIG. 3 is an exploded view to show the compact disk casing of the present invention in a closed status and a key is about to inserted in the base.
Figure 5:
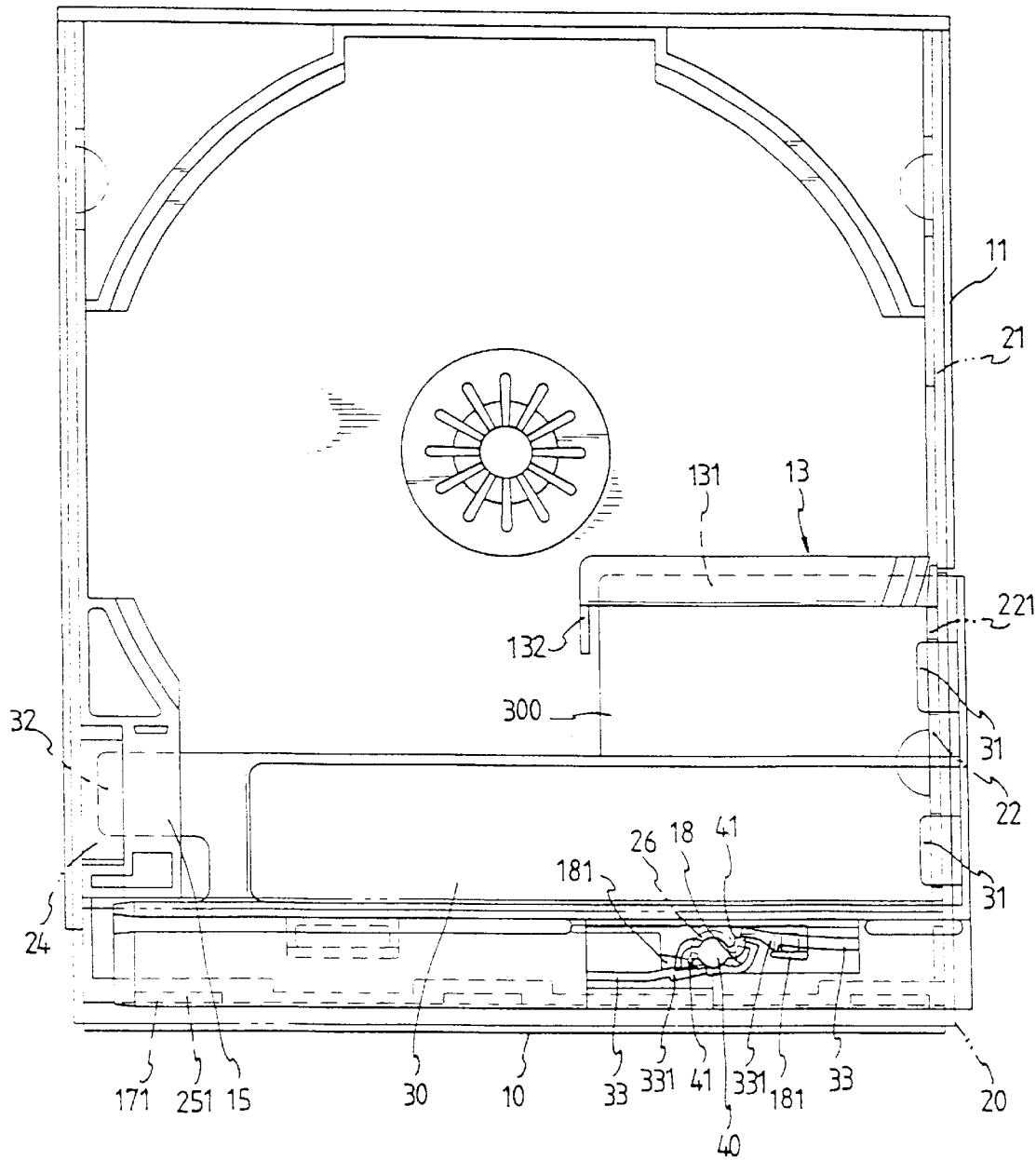
FIG. 5 shows the two wings of the key is engaged with the two matching members of the locking plate.
Figure 6:
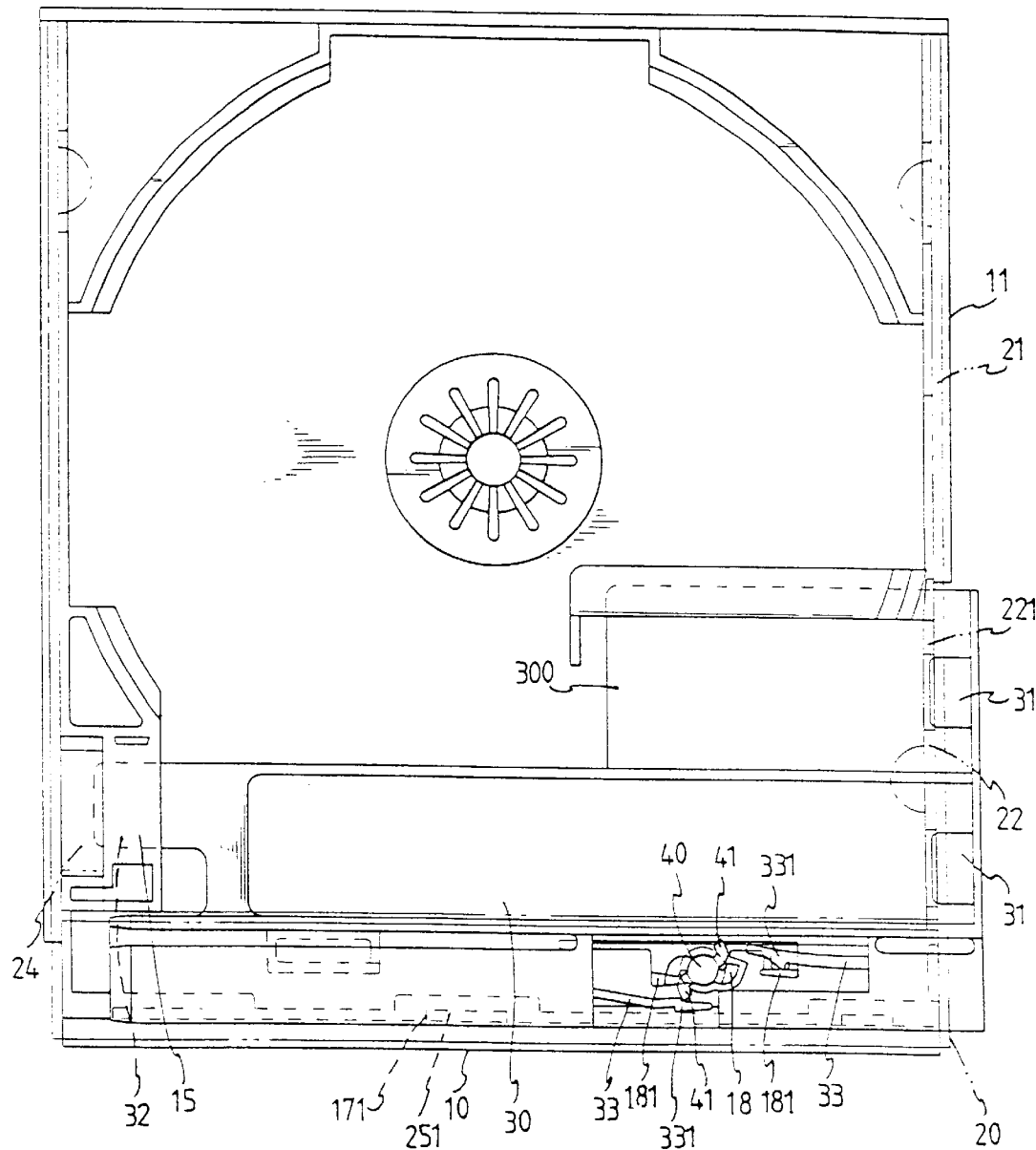
FIG. 6 shows the two matching members of the locking plate are shifted away from the two engaging members of the locking member by rotating the key.

Referring to FIGS. 3 and 5, a key 40 which is able to be inserted from an underside of the base 10 and reach the locking member 18. The key 40 has two wings 41 which are respectively engaged with the two hooks 331 of the two matching members 33. As shown in FIG. 6, when rotating the key 40, the two wings 41 shifts the two hooks 331 from the two engaging members 181 so that the locking plate 30 call be pulled out from the casing. By the locking device described above, the casing has an anti-theft feature.

While we have shown and described the embodiment in accordance with the present invention, it should be clear to those skilled in the art that further embodiments may be made without departing from the scope of the present invention.

What is claimed is:

1. A compact disk casing comprising:

a base having an opening defined in a first sidewall of said base, a bridge member located on a top surface of said base and located beside a second sidewall of said base, said second sidewall located opposite said first sidewall, a slot defined beneath of said bridge member, a locking member located on said top surface of said base and located beside a third sidewall of said base;

a cover pivotally connected to a fourth sidewall of said base and having a locking box located in an underside of said cover, said locking box having a hole therein and being positioned beside said bridge member when said cover is closed to said base, and a locking plate inserted through said opening when said cover is matched with said base, a tongue extending from said locking plate and through said slot beneath said bridge member, said tongue inserted in said hole in said locking box, two matching members on said locking plate engaged with said locking member.

2. The casino as claimed in claim 1 wherein said cover has a first cover sidewall which has two locking recesses defined therein, said locking plate having an end wall which has two ribs and said two ribs inserted in said locking recesses in said first cover sidewall of said cover.

3. The casing as claimed in claim 1 further comprising a key which is able to be inserted from an underside of said base and reach said locking member, said key having two wings which are respectively engaged with said two matching members.

4. The casing as claimed in claim 1 further comprising a guide plate connected to said first sidewall and a gap defined between said guide plate and said top surface of said base, a stop extending from said guide plate and said locking plate having an insertion plate which is inserted in said gap and stopped by said stop.

5. The casing as claimed in claim 1 wherein said matching members are flexible and each of which includes a hook, said locking member having two engaging members which are engaged with said hooks of said matching members.

6. The casing as claimed in claim 1 further comprising a plurality of lugs extending from said top surface of said base and located beside said third sidewall, said cover having a plurality of notches defined in said underside thereof and said lugs being engaged with said notches when said cover covers onto said base.

* * * * *